US010655694B2

(12) United States Patent
Okumura et al.

(10) Patent No.: US 10,655,694 B2
(45) Date of Patent: May 19, 2020

(54) FRICTION ENGAGEMENT DEVICE OF AUTOMATIC TRANSMISSION

(71) Applicant: Mazda Motor Corporation, Aki-gun, Hiroshima (JP)

(72) Inventors: Shinya Okumura, Hiroshima (JP); Kazuyuki Shiino, Hiroshima (JP); Hirokazu Kouno, Hiroshima (JP); Masanori Sasaki, Hiroshima (JP); Masamichi Fujikawa, Hatsukaichi (JP); Yasuo Miura, Hiroshima (JP); Masashi Morihiro, Hiroshima (JP); Takeyuki Tanaka, Hiroshima (JP); Yuya Takemura, Yamaguchi (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 113 days.

(21) Appl. No.: 15/938,108

(22) Filed: Mar. 28, 2018

(65) Prior Publication Data

US 2018/0306258 A1  Oct. 25, 2018

(30) Foreign Application Priority Data

Apr. 20, 2017  (JP) .................. 2017-083983

(51) Int. Cl.
*F16D 65/12* (2006.01)
*F16D 23/14* (2006.01)
(Continued)

(52) U.S. Cl.
CPC ......... *F16D 65/123* (2013.01); *F16D 13/644* (2013.01); *F16D 13/648* (2013.01);
(Continued)

(58) Field of Classification Search
CPC .... F16D 65/123; F16D 13/644; F16D 13/648; F16D 55/36; F16D 2065/1324;
(Continued)

(56) References Cited

U.S. PATENT DOCUMENTS 1,746,494 A * 2/1930 Norton ................. F16D 69/027
                                                      188/218 R
2,844,229 A * 7/1958 Whitfield ............... F16D 65/10
                                                      188/218 XL
(Continued)

FOREIGN PATENT DOCUMENTS

CN       106438778 A      2/2017
DE    102016217210 A1     3/2017
(Continued)

*Primary Examiner* — Stacey A Fluhart
(74) *Attorney, Agent, or Firm* — Alleman Hall Creasman & Tuttle LLP

(57) ABSTRACT

A friction engagement device of an automatic transmission is provided, which includes a rotational member comprised of at least one of a drum member and a hub member including a spline part engaged with a friction plate to be movable in axial directions of the automatic transmission, and a drive force transmitting part for exchanging a drive force with another rotational element. The drive force transmitting part of the rotational member is made of a ferrous metal. A part of the rotational member other than the drive force transmitting part is made of a clad material containing a first material that is easily joined to the ferrous metal and a second material that is less easily joined to the ferrous metal compared to the first material and weighs less than the ferrous metal.

7 Claims, 14 Drawing Sheets

(51) Int. Cl.
*F16D 13/64* (2006.01)
*F16D 55/36* (2006.01)
*F16D 67/02* (2006.01)
*F16D 69/04* (2006.01)
*F16H 57/00* (2012.01)
*F16D 13/68* (2006.01)
*F16D 25/0638* (2006.01)
*B23K 11/20* (2006.01)
*F16D 65/02* (2006.01)
*F16D 69/00* (2006.01)
*B23K 103/20* (2006.01)
*F16D 55/40* (2006.01)
*F16D 25/10* (2006.01)

(52) U.S. Cl.
CPC ........... *F16D 13/683* (2013.01); *F16D 23/14* (2013.01); *F16D 25/0638* (2013.01); *F16D 55/36* (2013.01); *F16D 67/02* (2013.01); *F16D 69/04* (2013.01); *F16H 57/0025* (2013.01); *B23K 11/20* (2013.01); *B23K 2103/20* (2018.08); *F16D 25/10* (2013.01); *F16D 55/40* (2013.01); *F16D 65/125* (2013.01); *F16D 65/127* (2013.01); *F16D 2065/1324* (2013.01); *F16D 2065/1372* (2013.01); *F16D 2065/1376* (2013.01); *F16D 2069/005* (2013.01); *F16D 2069/009* (2013.01); *F16D 2069/0458* (2013.01); *F16D 2200/003* (2013.01); *F16D 2200/0008* (2013.01); *F16D 2250/0076* (2013.01); *F16D 2300/12* (2013.01)

(58) Field of Classification Search
CPC ....... F16D 2200/0008; F16D 2200/003; F16D 13/52; B23K 2103/20
See application file for complete search history.

(56) References Cited

U.S. PATENT DOCUMENTS

| | | | | |
|---|---|---|---|---|
| 4,018,482 | A | * | 4/1977 | Rastogi ................ B60B 21/08 301/6.8 |
| 2012/0061203 | A1 | * | 3/2012 | Harmon ............... F16D 13/644 192/107 M |
| 2015/0362022 | A1 | * | 12/2015 | Heitzenrater ........... F16D 13/70 192/70.14 |
| 2017/0087995 | A1 | * | 3/2017 | Ito ......................... B60L 11/14 |
| 2018/0245647 | A1 | * | 8/2018 | Bonfanti ................ B60T 1/065 |
| 2018/0320745 | A1 | * | 11/2018 | Zanella ................ F16D 65/123 |

FOREIGN PATENT DOCUMENTS

| | | |
|---|---|---|
| EP | 3081826 A1 | 10/2016 |
| JP | 2010071408 A | 4/2010 |
| JP | 2010144766 A | 7/2010 |
| JP | 2014119009 A | 6/2014 |
| JP | 2015190504 A | 11/2015 |
| JP | 2016101606 A | 6/2016 |
| KR | 20170041546 A | 4/2017 |

* cited by examiner

| | 1ST CLUTCH (10) | 2ND CLUTCH (20) | 1ST BRAKE (70) | 2ND BRAKE (80) | 3RD BRAKE (90) |
|---|---|---|---|---|---|
| 1ST GEAR | ○ | | ○ | | |
| 2ND GEAR | ○ | | | ○ | |
| 3RD GEAR | ○ | | | | ○ |
| 4TH GEAR | ○ | ○ | | | |
| 5TH GEAR | | ○ | | | ○ |
| 6TH GEAR | | ○ | | ○ | |
| REVERSE GEAR | | | ○ | | ○ |

FIG. 2

FRICTION ENGAGEMENT DEVICE OF AUTOMATIC TRANSMISSION

TECHNICAL FIELD

The present disclosure relates to a friction engagement device (e.g., a clutch or a brake) of an automatic transmission and belongs to the technical field of a transmission that is mounted on a vehicle (e.g., an automobile).

BACKGROUND OF THE DISCLOSURE

General automatic transmissions mounted on a vehicle include a transmission gear mechanism, and a frictional engagement device which achieves a plurality of gear positions by switching a drive force transmission path of the transmission gear mechanism. The frictional engagement device includes clutches which engage and disengage two rotational members, and brakes which fix the rotation of one rotational member. For example, JP2010-071408A discloses such an automatic transmission.

The clutches disclosed in JP2010-071408A are multi-plate clutches having a plurality of friction plates. Each clutch includes, as rotational members, a drum member engaged with outer circumferences of some of the friction plates by a spline to be axially movable and coupled to a given rotational element of the transmission, and a hub member engaged with inner circumferences of the other friction plates by a spline to be axially movable and coupled to another given rotational element of the transmission.

Further, the brakes are generally multi-plate brakes having a plurality of friction plates similarly to the clutch described above. Each brake is engaged with outer circumferences of some of the friction plates by a spline to be axially movable with respect to a transmission case and includes, as a rotational member, a hub member engaged with inner circumferences of the other friction plates by a spline to be axially movable and coupled to a given rotational element of the transmission.

Note that the drum member of the clutch, the hub member of the clutch, or the hub member of the brake (hereinafter, simply referred to as "the drum member" or "the hub member") is provided with a drive force transmitting part to which a counter rotational member is coupled to exchange a drive force of an input shaft for receiving an input from a drive source, a gear of a transmission gear mechanism, etc.

Meanwhile, it is recently required for vehicles to weigh less so as to improve fuel efficiency of an engine and save energy, for example, by reducing power consumption when using a motor as a drive source. One discussed approach for this is reducing the weight of an automatic transmission. It may be considered to use aluminum for the drum member and the hub member that have relatively low strength requirements since they are heavy due to having large diameters and also tangential loads are comparatively low among rotational elements constituting the automatic transmission.

On the other hand, the drive force transmitting part that exchanges the drive force with the counter rotational member in the drum member or the hub member is, in many cases, provided at a rotation axis side of the transmission, and therefore the tangential load is larger than that of an outer circumferential part where the friction plates are fitted. Thus, the strength of aluminum is considered to be insufficient for the drive force transmitting part.

In this regard, it may be considered to form the drive force transmitting part with a ferrous metal. However, in this case, different materials, that is the ferrous metal forming the drive force transmitting part of the drum member or the hub member and aluminum forming the other parts, need to be joined by welding or the like, and the joining strength at the joint portion may become insufficient. It may also be considered to couple them with a bolt, but this will cause an increase in the number of parts, in size, etc.

Further, the plurality of friction plates engaged with the spline part of the drum member or the hub member have small axial dimensions (thicknesses). Therefore, a surface pressure on the spline part at positions where the spline teeth engage with the friction plates becomes high and the strength of the engaged portions of the spline part may become insufficient. In this regard, it may be considered to reduce the surface pressure against the drum member or the hub member by increasing the axial dimensions of the friction plates, but this will cause an increase in the axial dimension of the clutch or the brake, resulting in a size increase of the automatic transmission.

Meanwhile JP2016-101606A discloses an art for integrating aluminum and ferrous metal by electric resistance welding in which the ferrous metal and aluminum containing a given amount of silicon are pressure-welded and then power is applied. It may be considered to apply this joining technique to the drum member and the hub member.

However, the insufficient joining strength still cannot be avoided with such a joining technique.

SUMMARY OF THE DISCLOSURE

Therefore, the present disclosure aims to efficiently apply aluminum to a drum member and a hub member of a frictional engageable element that is a drive force transmitting member of an automatic transmission, and to effectively reduce them in weight while avoiding an issue of insufficient strength.

In order to the solve the above issue, a friction engagement device of an automatic transmission according to one aspect of the present disclosure is configured as follows.

First, the friction engagement device of the automatic transmission of this aspect includes a rotational member comprised of at least one of a drum member and a hub member including a spline part engaged with a friction plate to be movable in axial directions of the automatic transmission and a drive force transmitting part for exchanging a drive force with another rotational element. The drive force transmitting part of the rotational member is made of a ferrous metal. A part of the rotational member other than the drive force transmitting part is made of a clad material containing a first material that is easily joined to the ferrous metal, and a second material that is less easily joined to the ferrous metal compared to the first material and weighs less than the ferrous metal.

According to this configuration, in the drum member and the hub member as the rotational member of the friction engagement device of the automatic transmission, the drive force transmitting part for exchanging the drive force with another rotational element is made of the ferrous metal and the part other than the drive force transmitting part is made of the clad material containing the first material that is easily joined to the ferrous metal and the second material that is less easily joined to the ferrous metal compared to the first material and weighs less than the ferrous metal. Therefore, the automatic transmission is reduced in weight compared to when entirely made of the ferrous metal.

Further, for example, in order to reduce the weight of the automatic transmission, it may be considered to make the part other than the drive force transmitting part with aluminum. In this case, since it is difficult to join by welding the ferrous metal of the drive force transmitting part and the aluminum of the part other than the drive force transmitting part, they are coupled with a bolt, a spline, etc., and this may cause an increase in size of the automatic transmission in the axial directions. However, for example, when joining the part other than the drive force transmitting part to the drive force transmitting part, by applying the first material of the clad material to a side of the part other than the drive force transmitting part to which the drive force transmitting part is joined, their joining becomes possible while securing the joining strength.

Based on the two points described above, by efficiently applying the clad material to the drum member and the hub member of a frictional engageable element that is the drive force transmitting member of the automatic transmission while avoiding the issue of insufficient strength, the automatic transmission is effectively reduced in weight.

The first material of the clad material may be the ferrous metal, the second material may be aluminum, and the clad material may have a two-layer structure of the first and second materials.

According to this configuration, since the clad material forming the rotational member has the two-layer structure in which the first material is the ferrous metal and the second material is aluminum, the above described effects are achieved without causing a cost increase. Moreover, for example, by applying the first material of the clad material to the side of the part other than the drive force transmitting part to which the drive force transmitting part is joined, it is possible to use conventional equipment for joining the ferrous metal.

Further, since the first and second materials with different Young's moduli are used to form the clad material, a damping effect of the rotational member can be expected, and for example, so-called clutch squeak that occurs by a stick-slip phenomenon of a clutch called judder which occurs due to the clutch slipping at the time of engaging the clutch of the transmission is reduced.

A part of the rotational member other than the drive force transmitting part may have a joint portion with the drive force transmitting part, the spline part of the rotational member may have an engaging portion with the friction plate, and the joint portion and the engaging portion may be made of the first material of the clad material.

According to this configuration, since the joint portion of the part of the rotational member other than the drive force transmitting part with the drive force transmitting part and the engaging portion of the spline part of the rotational member with the friction plate are made of the first material of the clad material, the joining strength of the drive force transmitting part and the part other than the drive force transmitting part is secured, and in the engaging portion of the spline part of the rotational member, strength requirements for transmitting drive force by engaging the friction plate to the engaging portion are satisfied.

Incidentally, the friction engagement device of the automatic transmission may have, for example, a structure in which two rotational members are disposed to overlap radially, i.e., a dual clutch structure in which the drum member of the clutch disposed on the inner circumferential side and the hub member of the clutch disposed on the outer circumferential side are mutually used by the clutches. In such a dual clutch structure, friction plates are engaged to the inner circumferential side and the outer circumferential side of the spline part of the rotational members, respectively.

In this regard, the clad material may have a three-layer structure in which an intermediate layer is made of the second material and layers on both sides of the intermediate layer are made of the first material.

According to this configuration, since the clad material has the three-layer structure in which the intermediate layer is made of the second material and the layers on both sides of the intermediate layer are made of the first material, the engaging portions at the inner and outer circumferential sides of the spline parts of the rotational members with the friction plates are made of the first material, resulting in securing the strength of the rotational member. Moreover, by sandwiching the second material as the intermediate layer between the inner and outer circumferential sides of the spline parts of the rotational members that are made of the first material, weight reduction is achieved.

Further, for example, in a case where the engaging portion of the spline part of the rotational member with the friction plate is provided to a circumferential surface portion on one side with respect to the intermediate layer of the clad material and the joint portion of the rotational member with the drive force transmitting part is provided to a circumferential surface portion on the other side with respect to the intermediate layer of the clad material, the strength of the spline part in the circumferential surface portions is secured as well as securing the joining strength of the joint portion provided to the circumferential surface portion on the other side and the drive force transmitting part of the rotational member.

A portion of the spline part of the rotational member on an opposite side from an engaging portion with the friction plate may be made of the first material of the clad material.

According to this configuration, since the portion of the spline part of the rotational member on the opposite side from the engaging portion with the friction plate is formed by the first material, rigidity of the drum member itself of the clutch is increased and a deformation of the drum member is reduced compared to the case where the drum member of the clutch is made of aluminum. That is, for example, although there may be a case where an open-end portion of the drum member that is not joined to the drive force transmitting part deforms to open wider due to centrifugal force caused by the rotation of the drum member of the first clutch, such deformation is reduced.

The drive force transmitting part of the rotational member may have a vertical wall portion extending orthogonal to an axis of the rotational member. The clad material may be joined to the vertical wall portion.

According to this configuration, since the vertical wall portion extending orthogonal to the axis of the rotational member is provided to the drive force transmitting part of the rotational member, by joining and coupling the clad material to the vertical wall portion, the vertical wall portion is used for joining the drive force transmitting part of the rotational member to the other part. Thus, the joining strength is secured without separately providing a joining surface.

The drive force transmitting part of the rotational member may have a circumferential surface portion having a center line parallel to an axis of the rotational member. The clad material may be joined to the circumferential surface portion.

According to this configuration, since the circumferential surface portion extending having the center line parallel to the axis is provided to the drive force transmitting part of the rotational member, by joining and coupling the clad material to the circumferential surface portion, the circumferential surface portion is used for joining the drive force transmitting part of the rotational member to the other part. Thus, the joining strength is secured without separately providing a joining surface.

BRIEF DESCRIPTION OF THE DRAWINGS

FIG. 2 is an engaging combination table of the automatic transmission of FIG. 1.

DETAILED DESCRIPTION OF THE DISCLOSURE

Hereinafter, a friction engagement device of an automatic transmission according to embodiments of the present disclosure will be described.

Figure 1:
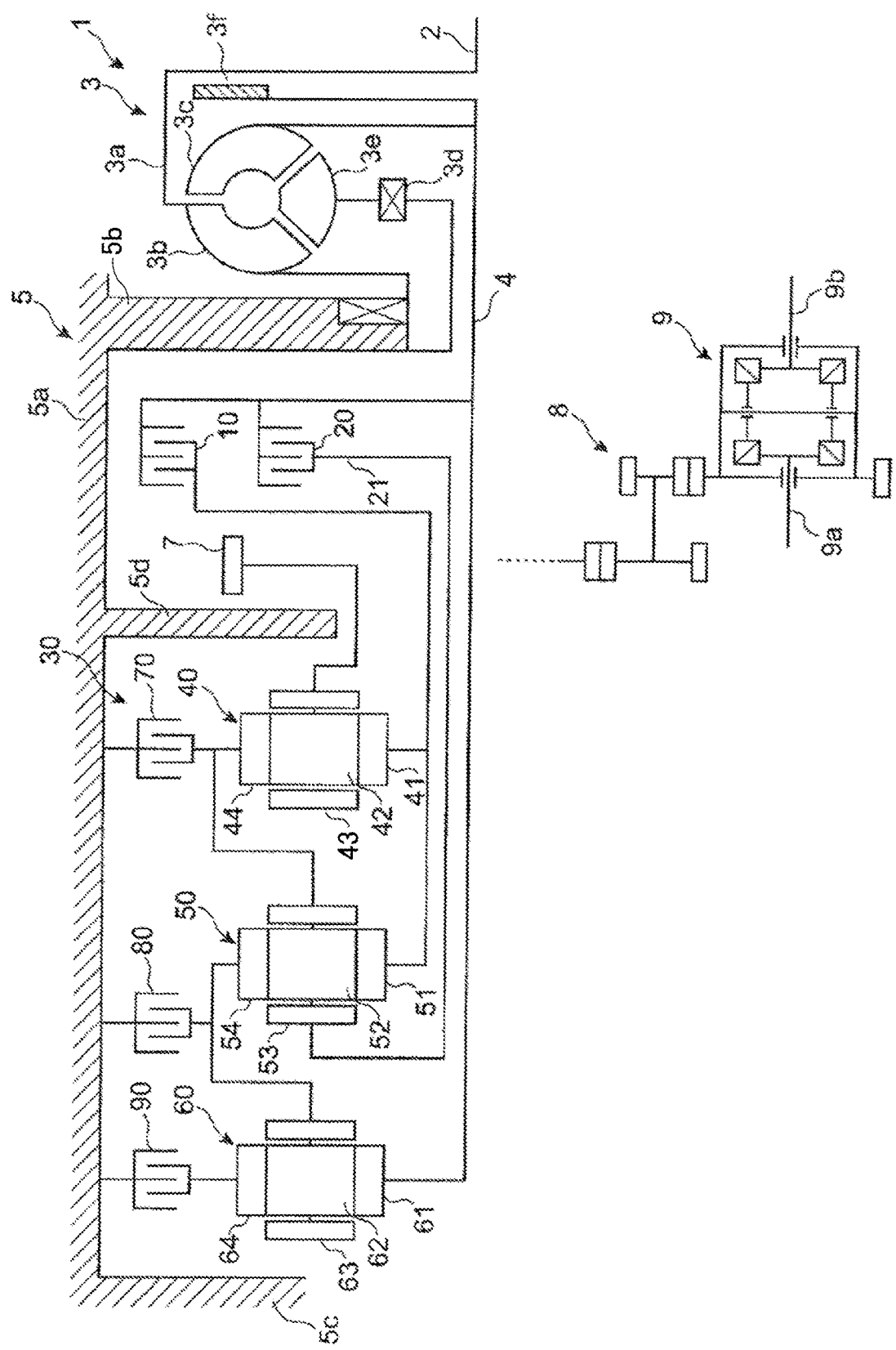
FIG. 1 is a substantial view of an automatic transmission according to a first embodiment of the present disclosure.

FIG. 1 is a substantial view of an automatic transmission 1 according to one embodiment of the present disclosure. This automatic transmission 1 is applied to an automobile with a transverse engine, such as a front-engine, front-drive vehicle. The automatic transmission 1 includes, as main components, a torque converter 3 attached to an engine output shaft 2, a first clutch 10 and a second clutch 20 to which a drive force is inputted from the torque converter 3 via an input shaft 4, and a transmission mechanism 30 to which the drive force is inputted from one or both of the clutches 10 and 20. These main components are arranged on the axis of the input shaft 4 and accommodated in a transmission case 5.

Here, the transmission case 5 includes a main body 5a constituting an outer circumference, a front (torque converter side) wall 5b accommodating an oil pump which is driven by the engine via the torque converter 3, an intermediate wall 5d provided in an intermediate part of the main body 5a, and an end cover 5c provided at the rear side (opposite side from the torque converter).

The first and second clutches 10 and 20 are accommodated between the front wall 5b and the intermediate wall 5d, and the transmission mechanism 30 is accommodated between the intermediate wall 5d and the end cover 5c, and an output gear 7 for extracting the drive force from the transmission mechanism 30 is disposed between the first and second clutches 10 and 20 in radial directions of the automatic transmission 1. The extracted drive force is transmitted to a differential device 9 via a counter drive mechanism 8 to drive left and right axles 9a and 9b.

The torque converter 3 includes a case 3a connected to the engine output shaft 2, a pump 3b fixed inside the case 3a, a turbine 3c that is disposed opposing to the pump 3b and driven by the pump 3b via hydraulic oil, a stator 3e that is interposed between the pump 3b and the turbine 3c, is supported by the transmission case 5 via a one-way clutch 3d, and increases torque, and a lockup clutch 3f which is provided between the case 3a and the turbine 3c and directly connects the engine output shaft 2 to the turbine 3c via the case 3a. Further, rotation of the turbine 3c is transmitted to the side of the first and second clutches 10 and 20 and the transmission mechanism 30 via the input shaft 4.

The transmission mechanism 30 has first, second and third planetary gear sets (hereinafter, referred to as "gear sets") 40, 50 and 60 between the intermediate wall 5d and the end cover 5c inside the transmission case 5, arranged in this order from the front side.

The first, second and third gear sets 40, 50 and 60 are all single pinion type planetary gear sets, and include sun gears 41, 51 and 61, pluralities of pinions 42, 52 and 62, carriers 43, 53 and 63, and ring gears 44, 54 and 64, respectively. The plurality of pinions 42, the plurality of pinions 52, and the plurality of pinions 62 are meshed with the sun gears 41, 51 and 61, respectively. The carriers 43, 53 and 63 support the pinions 42, 52 and 62, respectively. The ring gears 44, 54 and 64 are meshed with the pinions 42, 52 and 62, respectively.

The input shaft 4 is connected to the sun gear 61 of the third gear set 60, the sun gear 41 of the first gear set 40 is connected to the sun gear 51 of the second gear set 50, the ring gear 44 of the first gear set is connected to the carrier 53 of the second gear set 50, and the ring gear 54 of the second gear set 50 is connected to the carrier 63 of the third gear set 60. Further, the output gear 7 is connected to the carrier 43 of the first gear set 40.

Moreover, the sun gear 41 of the first gear set 40 and the sun gear 51 of the second gear set 50 are connected to a hub member 11 of the first clutch 10, which is an output member of the first clutch 10, and disconnectably connected to the input shaft 4 via the first clutch. The carrier 53 of the second gear set 50 is disconnectably connected to the input shaft 4 via a hub member 21 of the second clutch 20, which is an output member of the second clutch 20.

Further, the ring gear 44 of the first gear set 40 and the carrier 53 of the second gear set 50 are disconnectably connected to the transmission case 5 via a first brake 70 which is arranged in parallel order, the ring gear 54 of the second gear set 50 and the carrier 63 of the third gear set 60 are disconnectably connected to the transmission case 5 via a second brake 80, and the ring gear 64 of the third gear set 60 is disconnectably connected to the transmission case 5 via a third brake 90.

With the above structure, according to the automatic transmission 1, six forward gear ranges and one reverse gear range are obtained by combining engagement states of the first and second clutches 10 and 20 and the first, second and third brakes 70, 80 and 90. The relationship of the combination with the gear ranges is illustrated in the engaging combination table of FIG. 2.

Within the first gear range, the first clutch 10 and the first brake 70 are engaged. The rotation of the input shaft 4 is inputted to the sun gear 41 of the first gear set 40, decelerated by the first gear set 40 at a large reduction gear ratio, and outputted from the carrier 43 of the first gear set 40 to the output gear 7.

Within the second gear range, the first clutch 10 and the second brake 80 are engaged. The rotation of the input shaft 4 is inputted to the sun gear 41 of the first gear set 40 and also to the ring gear 44 of the first gear set 40 via the second gear set 50, decelerated at a smaller reduction gear ratio than within the first gear range, and outputted from the carrier 43 of the first gear set 40 to the output gear 7.

Within the third gear range, the first clutch 10 and the third brake 90 are engaged. The rotation of the input shaft 4 is inputted to the sun gear 41 of the first gear set 40 and also to the ring gear 44 of the first gear set 40 via the third gear set 60 and the second gear set 50, decelerated at a further smaller reduction gear ratio than within the second gear range, and outputted from the carrier 43 of the first gear set 40 to the output gear 7.

Within the fourth gear range, the first clutch 10 and the second clutch 20 are engaged. The rotation of the input shaft 4 is inputted as it is to the sun gear 41 of the first gear set 40 and also to the ring gear 44 of the first gear set 40 via the second gear set 50. Thus, the entire first gear set 40 rotates integrally with the input shaft 4, and the rotation at a reduction gear ratio 1 is outputted from the carrier 43 to the output gear 7.

Within the fifth gear range, the second clutch 20 and the third brake 90 are engaged. The rotation of the input shaft 4 is inputted as it is to the ring gear 44 of the first gear set 40 via the second gear set 50 and also to the sun gear 41 of the first gear set 40 via the third gear set 60 and the second gear set 50. Thus, the rotation of the input shaft 4 is accelerated and outputted from the carrier 43 of the first gear set 40 to the output gear 7.

Within the sixth gear range, the second clutch 20 and the second brake 80 are engaged. The rotation of the input shaft 4 is inputted as it is to the ring gear 44 of the first gear set 40 via the second gear set 50 and also to the sun gear 41 of the first gear set 40 via the second gear set 50. Thus, the rotation of the input shaft 4 is accelerated at a larger increase gear ratio than within the 5th gear range and outputted from the carrier 43 of the first gear set 40 to the output gear 7.

Within the reverse gear range, the first brake 70 and the third brake 90 are engaged. The rotation of the input shaft 4 is inputted to the sun gear 41 of the first gear set 40 via the third gear set 60 and the second gear set 50. Here, the rotating direction of the second gear set 50 is reversed so that the rotation in an opposite direction from the rotating direction of the input shaft 4 is outputted from the carrier 43 of the first gear set 40 to the output gear 7.

Next, specific structures of the first and second clutches 10 and 20 and the third brake 90 as the friction engagement devices constituting characteristic parts of the present disclosure will be described using FIGS. 3 to 10.

Figure 3:
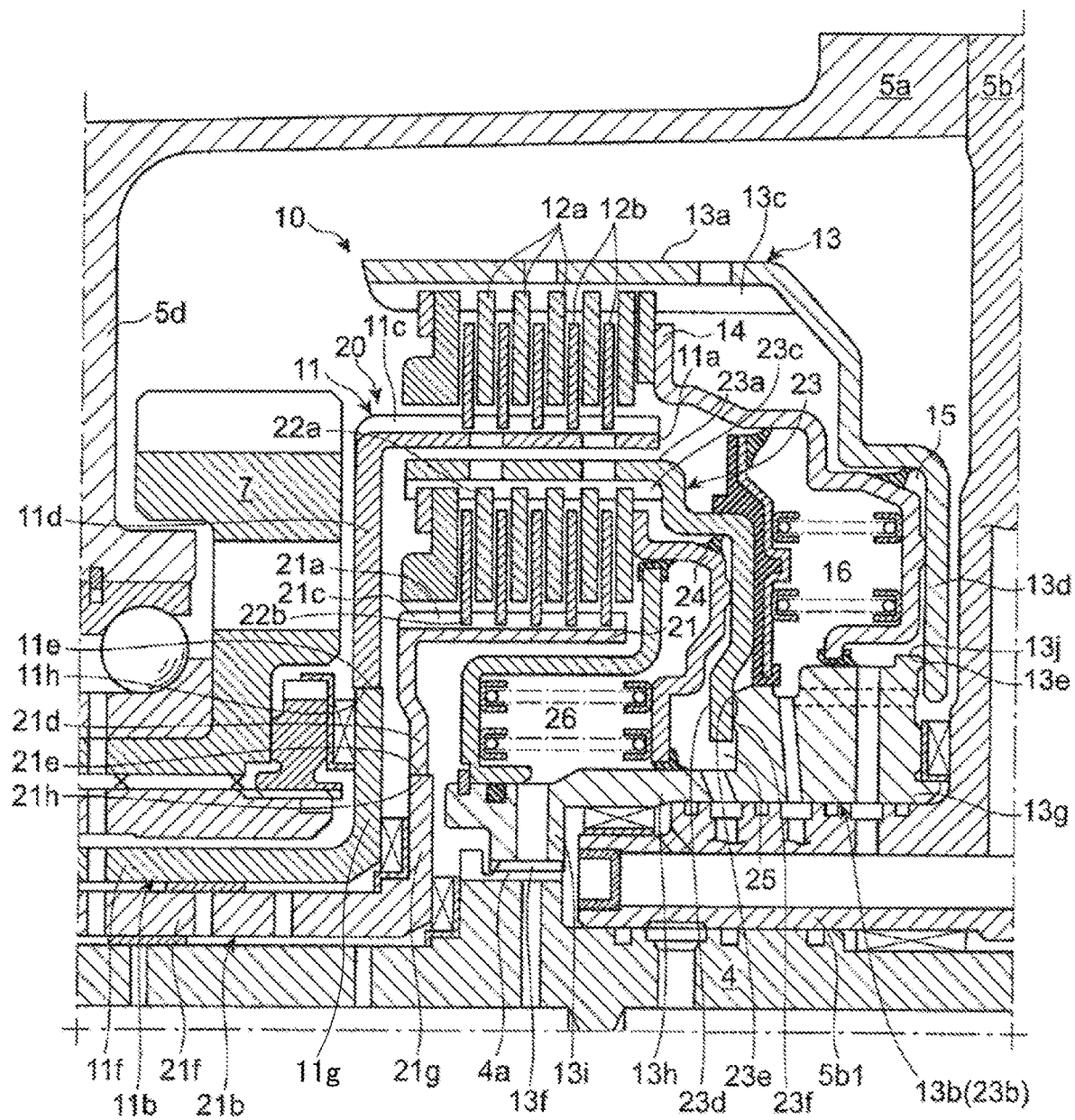
FIG. 3 is a cross-sectional view of a clutch part of the automatic transmission according to the first embodiment of the present disclosure.

FIG. 3 illustrates components of the automatic transmission 1 between the front wall 5b and the intermediate wall 5d of the transmission case 5.

As illustrated in FIG. 3, the first and second clutches 10 and 20 are multi-plate clutches having a plurality of friction plates. The first and second clutches 10 and 20 include drum members 13 and 23 supporting outer circumferences of a plurality of friction plates 12a and 22a to be axially movable, the hub members 11 and 21 supporting inner circumferences of a plurality of friction plates 12b and 22b to be axially movable, pistons 14 and 24 for pushing the plurality of friction plates 12a, 12b, 22a and 22b, and engaging hydraulic pressure chambers 15 and 25 where hydraulic pressure (hydraulic oil) is supplied to push the pistons 14 and 24, respectively. Further, the first and second clutches 10 and 20 include centrifugal balance chambers 16 and 26 disposed adjacent to the hydraulic pressure chambers 15 and 25 via the pistons 14 and 24, respectively.

Moreover, the first and second clutches 10 and 20 are parallelly arranged in the radial directions by disposing the second clutch 20 on the inner side of the first clutch 10.

Particularly in this embodiment, the drum members 13 and 23 of the first and second clutches 10 and 20 include cylindrical spline parts 13a and 23a supporting the plurality of friction plates 12a and 22a, and sleeve-like drive force transmitting parts 13b and 23b coupled to inner circumferential ends of the drum members 13 and 23, respectively.

The spline parts 13a and 23a are formed at their inner circumferential sides with engaging portions 13c and 23c with which the friction plates 12a and 22a are engaged, respectively. Connecting portions 13d and 23d extend radially inward from front (right side in the drawing) end portions of the spline parts 13a and 23a, and joint portions 13e and 23e formed at lower end portions of the connecting portions 13d and 23d are joined to the sleeve-like drive force transmitting parts 13b and 23b, respectively.

The sleeve-like drive force transmitting parts 13b and 23b extend further to the rear side (the left side in the drawing) than a tip end of a boss part 5b1 axially extending rearward from a center portion of the front wall 5b and supporting the input shaft 4 at the further rear side portion by inserting it thereinto, and they are coupled to the input shaft 4 at the further rear side portions. For example, a spline 13f formed in inner circumferential surfaces of the sleeve-like drive force transmitting parts 13b and 23b is engaged with a spline 4a formed in an outer circumferential surface of the input shaft 4 opposing to the spline 13f. Therefore, together with the input shaft 4, the drum members 13 and 23 of the first and second clutches 10 and 20 rotate together with the input shaft 4 via the sleeve-like drive force transmitting parts 13b and 23b.

Further, the sleeve-like drive force transmitting parts 13b and 23b are made of ferrous metal, have stepped shapes, and include a front portion 13g having a large outer diameter, a center portion 13h having a smaller outer circumferential diameter than the front portion 13g, and a rear portion 13i having a smaller outer circumferential diameter than the center portion 13h. A front (right side in the drawing) vertical wall portion 13j of the front portion 13g and a rear (left side in the drawing) vertical wall portion 23f are welded to the joint portions 13e and 23e of the drum members 13 and 23 of the first and second clutches 10 and 20, respectively.

Note that in this embodiment, the sleeve-like drive force transmitting part 13b of the drum member 13 of the first clutch 10 and the sleeve-like drive force transmitting part 23b of the drum member 23 of the second clutch 20 are formed by a single component.

Further in this embodiment, the hub members 11 and 21 of the first and second clutches 10 and 20 have cylindrical spline parts 11a and 21a supporting the plurality of friction plates 12b and 22b, and drive force transmitting parts 11b and 21b coupled to the inner circumferential side of the hub members 11 and 21, respectively.

The spline parts 11a and 21a are formed, at their outer circumferential sides, with engaging portions 11c and 21c with which the friction plates 12a and 22a are engaged, respectively. Vertical wall portions 11d and 21d extend radially inward from rear end portions of the spline parts 11a and 21a, and joint portions 11e and 21e formed at lower end portions of the vertical wall portions 11d and 21d are joined to the drive force transmitting parts 11b and 21b, respectively.

The drive force transmitting parts 11b and 21b of the hub members 11 and 21 are provided with cylindrical portions 11f and 21f extending axially at the inner circumferential side from the rear side of the vertical wall portion 23f of the sleeve-like drive force transmitting parts 13b and 23b, and flange portions 11g and 21g extending radially outward from front end portions of the cylindrical portions 11f and 21f.

Splines 11f' and 21f' formed in rear end portions of the cylindrical portions 11f and 21f are engaged with the sun gear 51 of the second gear set 50 and a connecting portion 53' extending radially inward from the carrier 53 of the second gear set 50, respectively. Therefore, the sun gear 51 and the carrier 53 of the second gear set 50 rotate via the drive force transmitting parts 11b and 21b of the hub members 11 and 21 (see FIG. 4).

Further, the drive force transmitting parts 11b and 21b of the hub members 11 and 21 are made of ferrous metal. Circumferential surface portions 11h and 21h formed at tip ends of the flange portions 11g and 21g of the drive force transmitting parts 11b and 21b and having central axes in a parallel direction to an axis of the drive force transmitting part 11b are welded to the joint portions 11e and 21e of the vertical wall portions 11d and 21d of the hub members 11 and 21, respectively.

Figure 4:
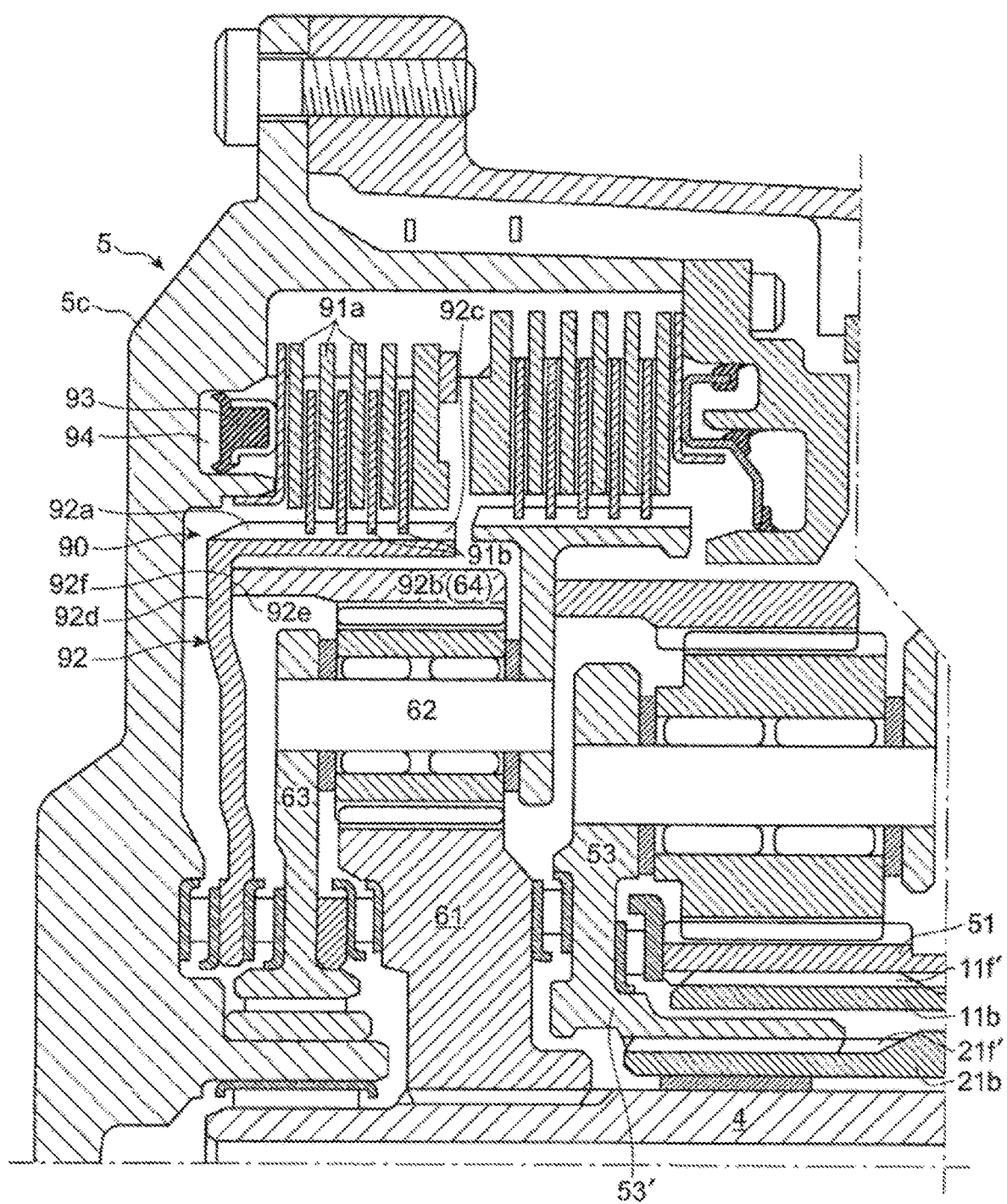
FIG. 4 is a cross-sectional view of a brake part being a part of the automatic transmission according to the first embodiment of the present disclosure.

As illustrated in FIG. 4, the third brake 90 is a multi-plate brake having a plurality of friction plates. Some of the plurality of friction plates 91a of the third brake 90 are supported at their outer circumference by the end cover 5c constituting the transmission case 5 so as to be axially movable, and the rest of the plurality of friction plates 91b are supported at their inner circumference by a hub member 92 so as to be axially movable. The third brake 90 includes a piston 93 for pushing the plurality of friction plates 91a and 91b and an engaging hydraulic chamber 94 to which hydraulic pressure (hydraulic oil) is supplied to push the piston 93.

Particularly in this embodiment, the hub member 92 of the third brake 90 is provided with a cylindrical spline part 92a supporting the plurality of friction plates 91b, and a drive force transmitting part 92b coupled to an inner circumferential side of the hub member 92.

The spline part 92a of the third brake 90 is provided, at its outer circumferential side, with an engaging portion 92c for engaging the friction plates 91b, and a flange portion 92d extending radially inward from a rear end portion of the spline part 92a.

The drive force transmitting part 92b of the third brake 90 is made of ferrous metal and a rear end portion 92e thereof is joined to a joint portion 92f provided in a front surface of the flange portion 92d.

In this embodiment, the drive force transmitting part 92b is the same member as the ring gear 64 of the third gear set 60.

Meanwhile, parts of the drum members 13 and 23 and the hub members 11 and 21 of the first and second clutches 10 and 20 other than the drive force transmitting parts 11b, 13b, 23b and 31b, and parts of the hub member 92 of the third brake 90 other than the drive force transmitting part 92b are made of a clad material containing ferrous metal as a first material and aluminum as a second material.

Here, the clad material is described with reference to FIG. 5.

Figure 5A:
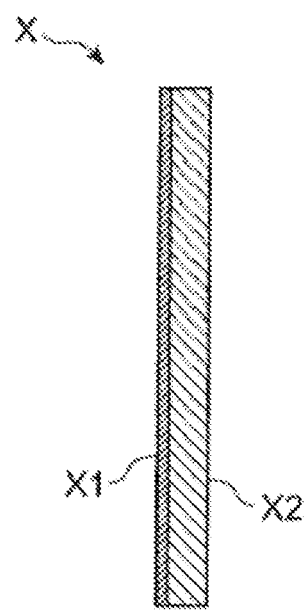
FIGS. 5A and 5B are views of clad materials of the embodiment of the present disclosure.

As illustrated in FIG. 5A, the clad material X is formed by a plate material having a two-layer structure in which a ferrous metal layer X1 as the first material and an aluminum layer X2 as the second material are integrated by diffusion welding in which they are pressured-welded and then heated.

Figure 5B:
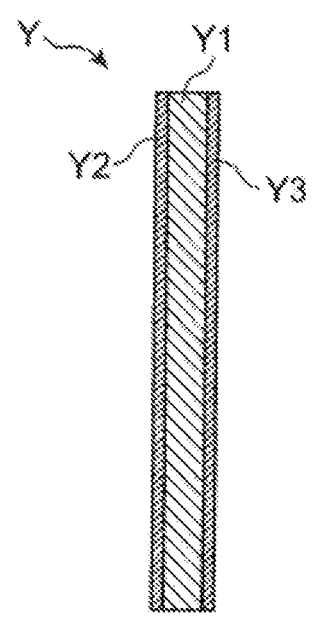

Further, as illustrated in FIG. 5B, the clad material Y may be formed by a plate member having a three-layer structure. In this case, the clad material Y is formed by an aluminum layer Y1 as an intermediate layer and ferrous metal layers Y2 and Y3 on both sides of the intermediate layer.

Figure 6:
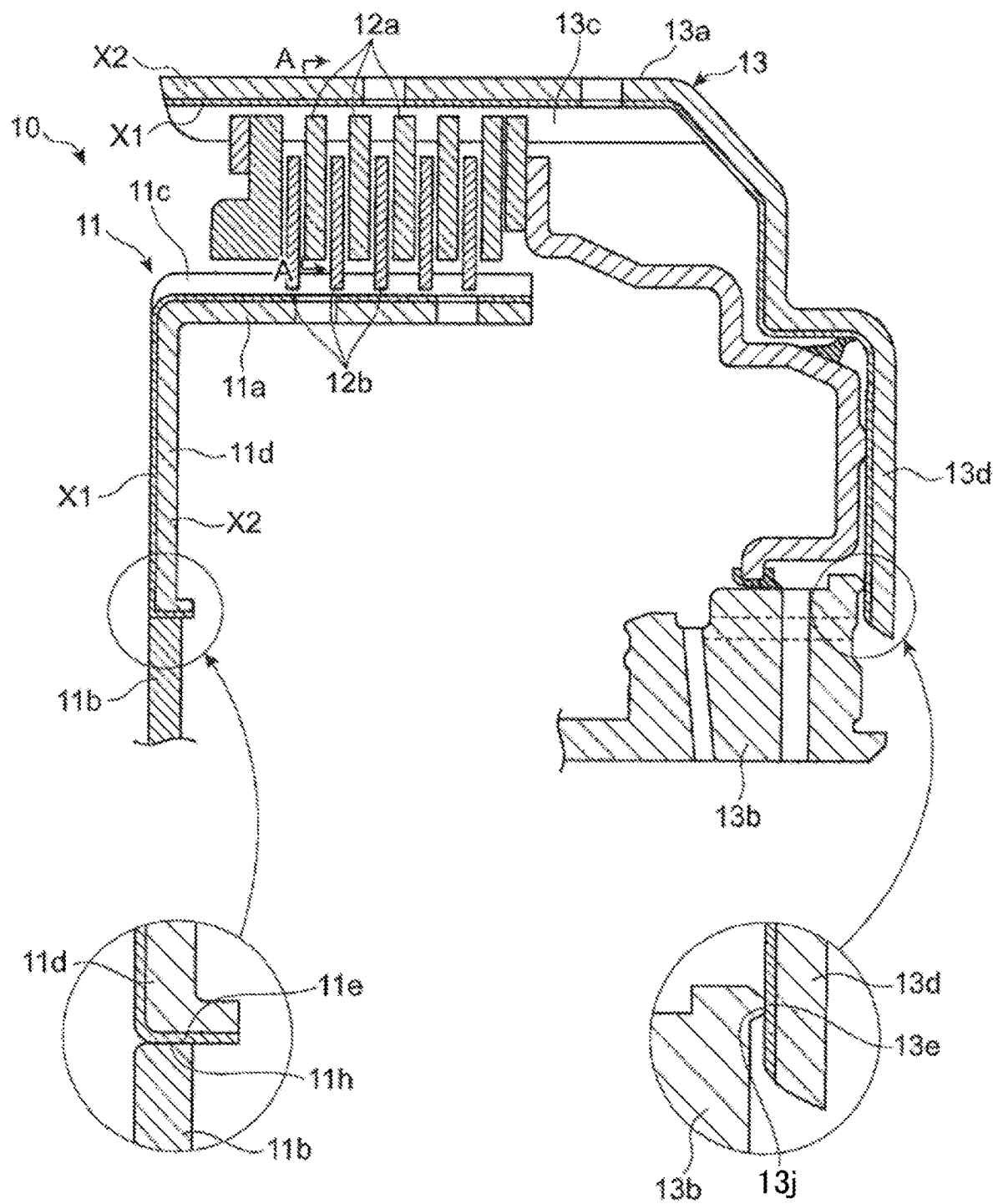
FIG. 6 is an enlarged view of a main part of a first clutch in FIG. 3.

As illustrated in FIG. 6, when the clad material X is applied to the drum member 13 of the first clutch 10, the clad material X is formed into a cylindrical shape by a deep drawing press work such that the ferrous metal layer X1 of the clad material X comes on the inner circumferential side and the aluminum layer X2 comes on the outer circumferential side. Then, a spline is formed in an inner circumferential surface of the ferrous metal layer X1.

Thus, parts of the drum member 13 other than the drive force transmitting part 13b are made of the clad material X having the two-layer structure including the ferrous metal layer X1 on the inner circumferential portion side and the aluminum layer X2 on the outer circumferential portion side, and the joint portion 13e formed by the ferrous metal layer X1 of the connecting portion 13d of the drum member 13 is axially joined to the vertical wall portion 13j of the sleeve-like drive force transmitting part 13b.

In this embodiment, the sleeve-like drive force transmitting part 13b and the connecting portion 13d of the drum member 13 may adopt projection welding in which they are pinched between a pair of electrodes and welded by applying power between the electrodes.

Further, the friction plates 12a are engaged with the engaging portion 13c made of ferrous metal at the inner circumferential side of the spline part 13a of the drum member 13 of the first clutch 10.

Further, when the clad material X is applied to the hub member 11 of the first clutch 10, the clad material X is formed into a cylindrical shape by a deep drawing press work such that the ferrous metal layer X1 of the clad material X comes on the outer circumferential side and the aluminum layer X2 comes on the inner circumferential side. Then, a spline is formed in an outer circumferential surface of the ferrous metal layer X1.

Thus, the parts of the hub member 11 other than the drive force transmitting part 11b are made of the clad material X having the two-layer structure including the ferrous metal layer X1 on the outer circumferential portion side and the aluminum layer X2 on the inner circumferential portion side. Further, the lower end portion of the vertical wall portion 11d of the hub member 11 is burred to bring the ferrous metal layer X1 of the vertical wall portion 11d to the inner circumferential portion side so as to form the joint portion 11e. The joint portion 11e is welded to the circumferential surface portion 11h of the drive force transmitting part 11b.

In this embodiment, the circumferential surface portion 11h of the drive force transmitting part 11b and the vertical wall portion 11d of the hub member 11 may adopt ring mash welding in which an inner metal member is welded to an annular-shaped outer metal member by applying power while press-fitting the inner metal member into an inner circumferential surface of the outer metal member.

Figure 7:
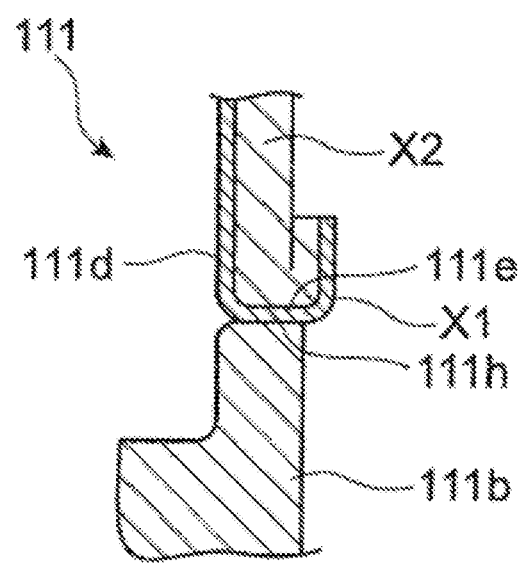
FIG. 7 is an enlarged view of a main part of a joint portion between a drive force transmitting part of a hub member and a part other than the drive force transmitting part according to a modification of the first embodiment.

Note that the lower end portion of the vertical wall portion 11*d* of the hub member 11 may be processed by hemming instead of burring. For example, as illustrated in FIG. 7, parts of a hub member 111 other than a drive force transmitting part 111*b* are made of the clad material X having the two-layer structure including the ferrous metal layer X1 on the outer circumferential portion side and the aluminum layer X2 on the inner circumferential portion side. The lower end portion of a vertical wall 111*d* of the hub member 111 is hemmed to bring the ferrous metal layer X1 of the vertical wall 111*d* to the inner circumferential portion side and fold it so as to form a joint portion 111*e*, and the joint portion 111*e* is welded to a circumferential surface portion 111*h* of the drive force transmitting part 111*b*.

Here, the spline part 13*a* of the drum member of the first clutch 10 and the friction plates 12*a* engaged with the spline part 13*a* when applying the clad material X will be described with reference to FIG. 8 which illustrates a cross section taken along the line A-A in FIG. 6.

Figure 8:
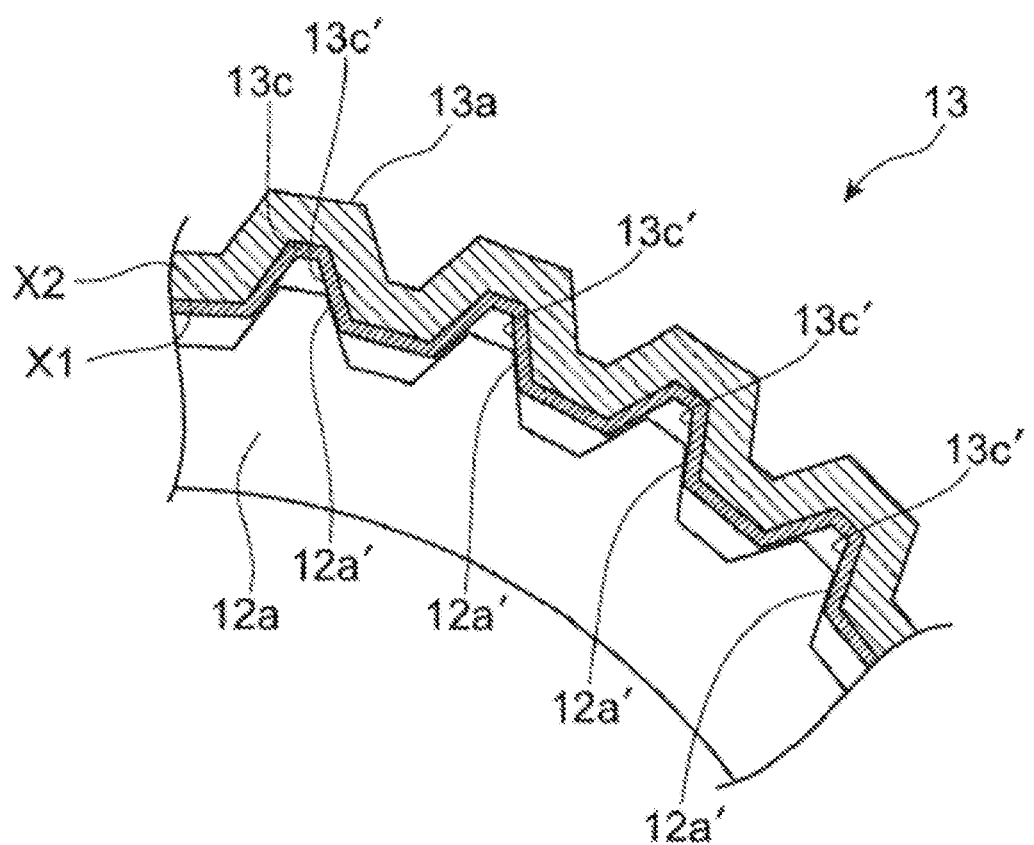
FIG. 8 is an A-A cross-sectional view of FIG. 6.

As illustrated in FIG. 8, the friction plates 12*a* are engaged with the engaging portion 13*c* of the spline part 13*a* of the drum member 13 of the first clutch 10, and the engaging portion 13*c* is provided with contact surfaces 13*c*' to which teeth 12*a*' of the friction plates 12*a* contact when transmitting the drive force.

The engaging portion 13*c* is formed by the ferrous metal layer X1 of the clad material X, and the contact surfaces 13*c*' provided in the engaging portion are also formed by the ferrous metal layer X1.

Figure 9:
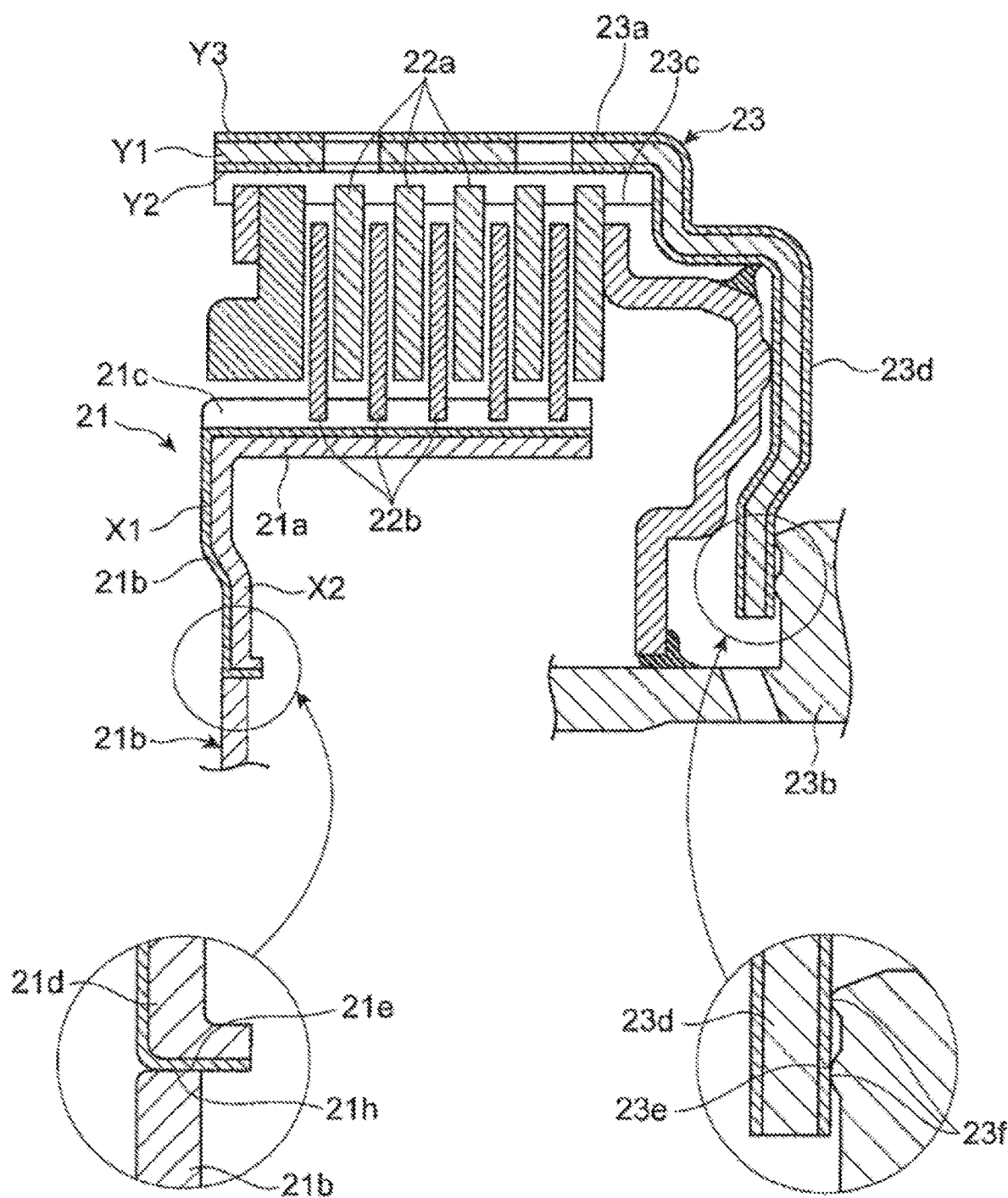
FIG. 9 is an enlarged view of a main part of a second clutch in FIG. 3.

Further, as illustrated in FIG. 9, when the clad material Y is applied to the drum member 23 of the second clutch 20, the clad material Y is formed into a cylindrical shape by a deep drawing press work such that one of the ferrous metal layers (Y2) of the clad material Y comes on the inner circumferential side and the other ferrous metal layer Y3 comes on the outer circumferential side. Then, a spline is formed in an inner circumferential surface of the ferrous metal layer Y2.

Thus, parts of the drum member 23 other than the drive force transmitting part 23*b* are made of the clad material Y having the three-layer structure formed by the aluminum layer Y1 as the intermediate layer and the ferrous metal layers Y2 and Y3 on both sides of the intermediate layer. The joint portion 23*e* formed by the ferrous metal layer Y3 in the connecting portion 23*d* of the drum member 23 is joined to the vertical wall portion 23*f* of the sleeve-like drive force transmitting part 23*b*.

Further, the friction plates 22*a* are engaged with the engaging portion 23*c* made of ferrous metal at the inner circumferential side of the spline part 23*a* of the drum member 23 of the second clutch 20.

Further, when the clad material X is applied to the hub member 21 of the second clutch 20, similar to the hub member 11 of the first clutch 10, the clad material X is formed into a cylindrical shape by a deep drawing press work such that the ferrous metal layer X1 of the clad material X comes on the outer circumferential side and the aluminum layer X2 comes on the inner circumferential side. Then, a spline is formed in an outer circumferential surface of the ferrous metal layer X1.

Thus, the parts of the hub member 21 other than the drive force transmitting part 21*b* are made of the clad material X having the two-layer structure including the ferrous metal layer X1 on the outer circumferential portion side and the aluminum layer X2 on the inner circumferential portion side. Further, the lower end portion of the vertical wall portion 21*d* of the hub member 21 is burred to bring the ferrous metal layer X1 of the vertical wall portion 21*d* to the inner circumferential portion side so as to form the joint portion 21*e*. The joint portion 21*e* is welded to the circumferential surface portion 21*h* of the drive force transmitting part 21*b*. Note that similar to the hub member 11 of the first clutch 10, the lower end portion of the vertical wall portion 21*d* of the hub member 21 may be processed by hemming instead of burring.

Figure 10:
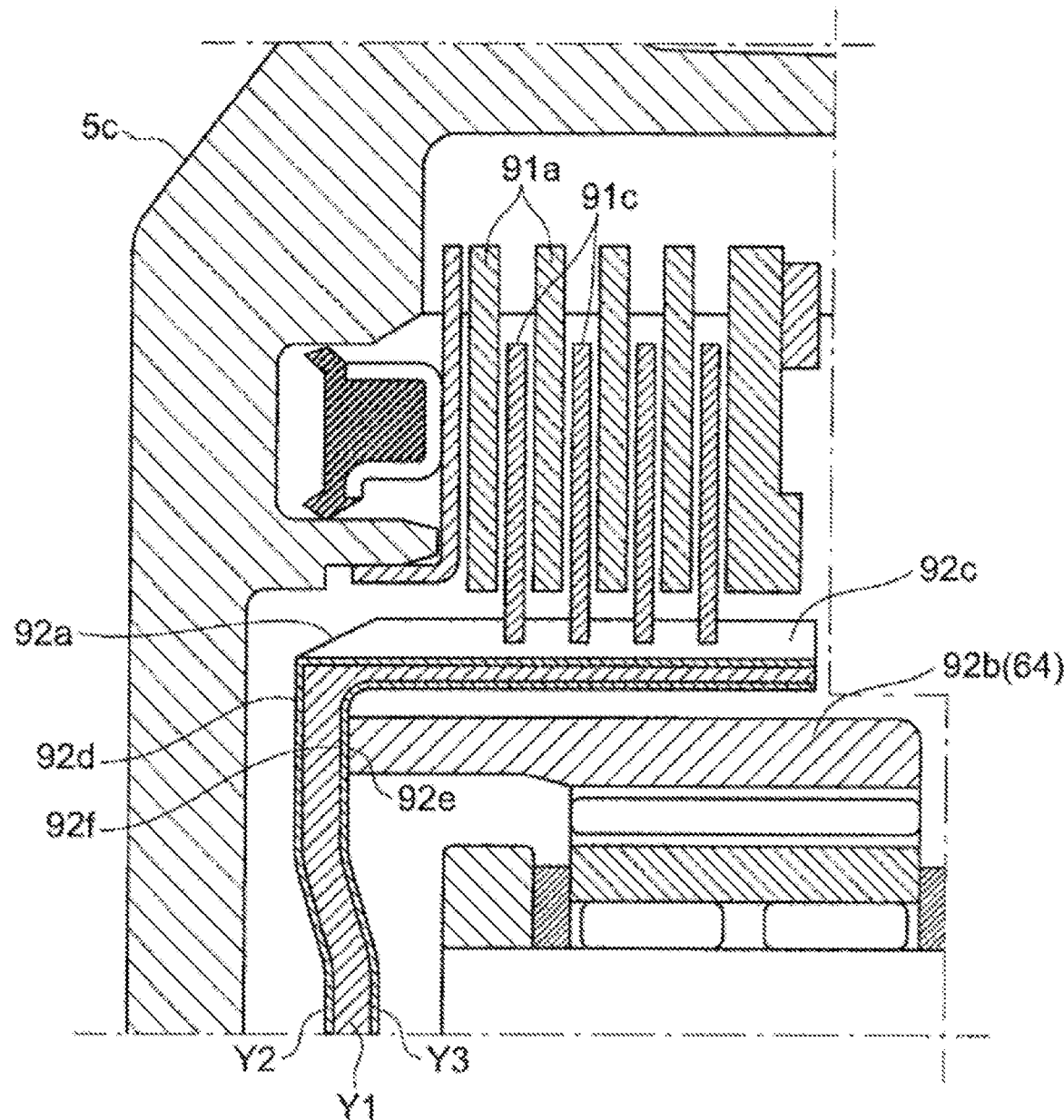
FIG. 10 is an enlarged view of a main part of a third brake in FIG. 4.

Further, as illustrated in FIG. 10, when the clad material Y is applied to the hub member 92 of the third brake 90, the clad material Y is formed into a cylindrical shape by a deep drawing press work such that one of the ferrous metal layers (Y2) of the clad material Y comes on the outer circumferential side and the other ferrous metal layer Y3 comes on the inner circumferential side. Then, a spline is formed in an outer circumferential surface of the ferrous metal layer Y2.

Thus, parts of the hub member 92 other than the drive force transmitting part 92*b* are made of the clad material Y having the three-layer structure formed by the aluminum layer Y1 as the intermediate layer and the ferrous metal layers Y2 and Y3 on both sides of the intermediate layer. The joint portion 92*f* provided in the surface formed by the ferrous metal layer Y3 of the flange portion 92*d* of the hub member 92 is welded to the rear end portion 92*e* of the drive force transmitting part 92*b*.

With the above structure, according to this embodiment, the ferrous metal layers X1, Y2, and Y3 of the clad materials X and Y form the joint portions 11*e*, 13*e*, 21*e*, and 23*e* with the drive force transmitting parts 11*b*, 13*b*, 21*b*, and 23*b* of the drum members 13 and 23 and the hub members 11 and 21 of the first and second clutches 10 and 20, and the joint portion 92*f* with the drive force transmitting part 92*b* of the hub member 92 of the third brake 90. Therefore, the joining strength with the drive force transmitting parts 11*b*, 13*b*, 21*b*, 23*b*, and 92*b* is secured.

Note that the vertical wall portions 13*j* and 23*f* provided in the sleeve-like drive force transmitting parts 13*b* and 23*b* of the drum members 13 and 23 of the first and second clutches 10 and 20 and extending in the intersecting direction with the axis are used for joining, and the circumferential surface portions 11*h* and 21*h* provided in the drive force transmitting parts 11*b* and 21*b* of the hub members 11 and 21 of the first and second clutches 10 and 20 and having center lines parallel to the axis are used for connecting. Thus, the joining strength between the both portions is secured without separately providing a joining surface.

The ferrous metal layers X1, Y2, and Y3 of the clad materials X and Y form the engaging portions 11*c*, 13*c*, 21*c*, and 23*c* of the spline parts 11*a*, 13*a*, 21*a*, and 23*a* of the drum members 13 and 23 and the hub members 11 and 21 of the first and second clutches 10 and 20, and the engaging portion 92*c* of the spline part 92*a* of the hub member 92 of the third brake 90. Thus, the strength requirements for the engaging portions 11*c*, 13*c*, 21*c*, 23*c*, and 92*c* which transmit the drive force are satisfied.

Further, as described above, the aluminum layers X2 and Y1 form the layers of the drum members 13 and 23 and the hub members 11 and 21 of the first and second clutches and the hub member 92 of the third brake 90 other than the layers X1, Y2, and Y3 that include the joint portions and also the engaging portions in the spline parts. Thus, the weights of the rotational members 11, 13, 21, 23, and 92 are reduced.

Here, effects of the engaging portion 13*c* of the drum member 13 of the first clutch 10 with the friction plates 12*a* will be described with reference to FIG. 8. Although the following description will be given about the illustrated drum member 13 of the first clutch 10 and the plurality of friction plates 12b engaged with the drum member 13, similar effects also apply to the hub member 11 of the first clutch 10 and the friction plates 12b engaged with the hub member 11, the drum member 23 of the second clutch 20 and the friction plates 22a engaged with the drum member 23, the hub member 21 of the second clutch 20 and the friction plates 22b engaged with the hub member 21, and the hub member 92 of the third brake 90 and the friction plates 91b engaged with the hub member 92.

As illustrated in FIG. 8, the spline teeth 12a' of the friction plates 12a contact the side of the engaging portion 13c when transmitting the drive force. Since the friction plates 12a are thin, high surface pressure acts on the contact surfaces 13c' with the spline teeth 12a' of the friction plates 12a. Thus, the contact surfaces 13c' of the drum member 13 require high strength.

In this regard, the contact surfaces 13c' on the side of the engaging portion 13c of the spline part 13a of the drum member 13 is formed by the ferrous metal layer X1 of the clad material X. Therefore, while securing the strength of the contact surfaces 13c' of the drum member 13, for example, the axial dimension of the drum member 13 is reduced compared to a case where the contact surfaces 13c' are made of aluminum.

In this embodiment, since the ferrous metal and aluminum with different Young's moduli are used for the clad materials X and Y, the damping effect of the rotational member can be expected, and judder that occurs due to the clutch slipping at the time of engaging the clutch of the transmission is reduced.

Further, by using the ferrous metal and aluminum which are easy to acquire as the clad materials X and Y forming the parts of the rotational members 11, 13, 21, 23, and 92 other than the drive force transmitting parts 11b, 13b, 21b, 23b, and 92b, a cost increase is prevented. Moreover, since the ferrous metal layers X1, Y2, and Y3 form the joint portions 11e, 13e, 21e, 23e, and 92f between the drive force transmitting parts 11b, 13b, 21b, 23b, and 92b of the rotational members 11, 13, 21, 23, and 92 and the other portions than the drive force transmitting parts 11b, 13b, 21b, 23b, and 92b, respectively, it is possible to use conventional equipment for joining them.

Next, a friction engagement device of an automatic transmission according to a second embodiment will be described with reference to FIGS. 11 and 12. Note that the components similar to those in the first embodiment illustrated in FIG. 6 are assigned with the same reference characters in FIGS. 11 and 12, and description thereof is omitted.

In this embodiment, the structure of a drum member 213 of a first clutch 210 is different from the first embodiment except for the drive force transmitting part 13b. Note that other parts have similar structures to those in the above embodiment, and similar effects to those in the first embodiment are obtained.

Figure 11:
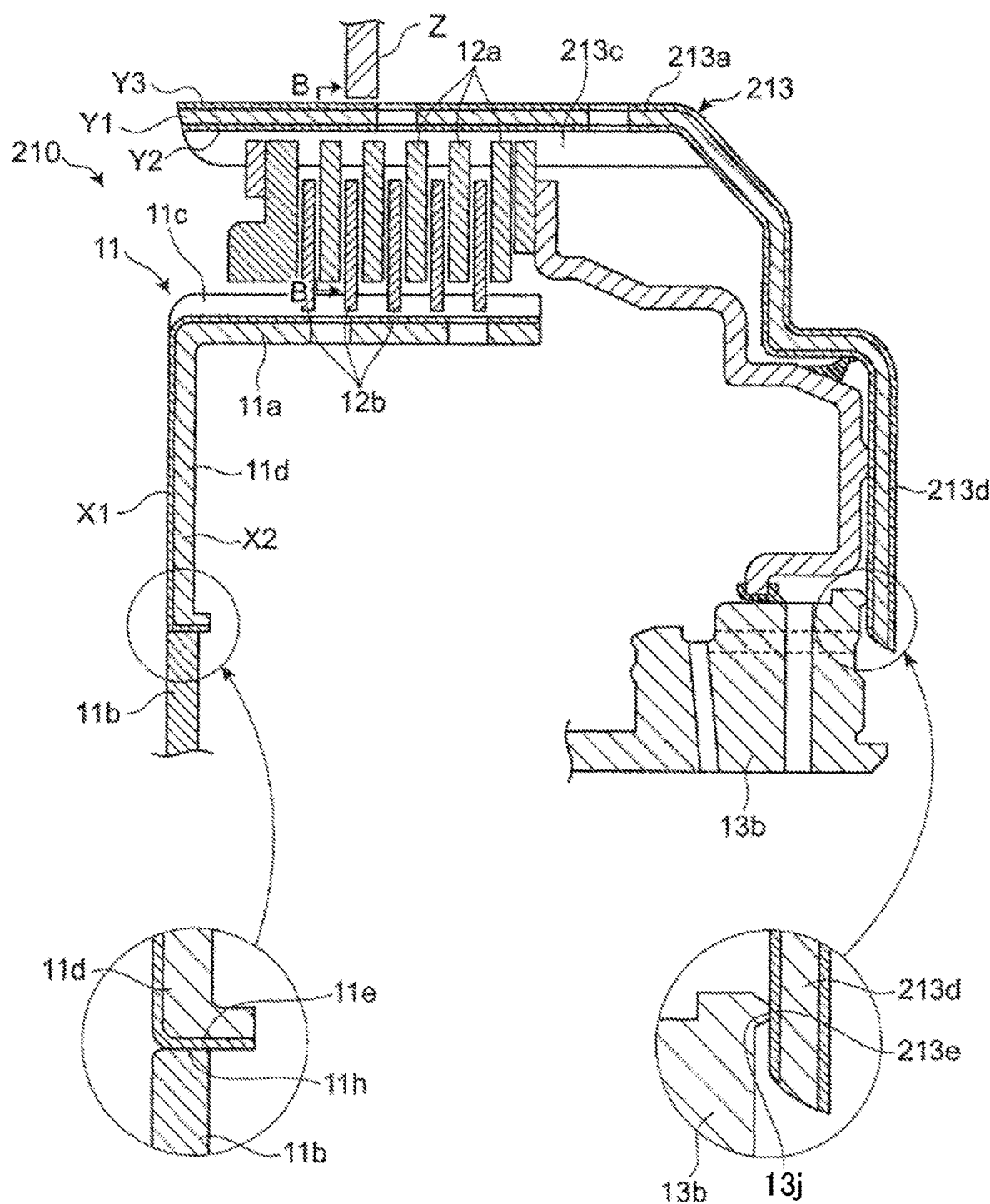
FIG. 11 is a cross-sectional view equivalent to FIG. 6 according to a second embodiment of the present disclosure.

As illustrated in FIG. 11, when the clad material Y is applied to the drum member 213 of the first clutch 210, the clad material Y is formed into a cylindrical shape by a deep drawing press work such that the ferrous metal layer Y2 of the clad material Y comes on the inner circumferential side and the ferrous metal layer Y3 comes on the outer circumferential side. Then, a spline is formed in an inner circumferential surface of the ferrous metal layer Y2 on the inner circumferential side.

Thus, parts of the drum member 213 other than the drive force transmitting part 13b are made of the clad material Y having the three-layer structure formed by the aluminum layer Y1 as the intermediate layer and the ferrous metal layers Y2 and Y3 on both sides of the intermediate layer. A joint portion 213e formed by the ferrous metal layer Y3 in a connecting portion 213d of the drum member 213 is joined to the vertical wall portion 13j of the sleeve-like drive force transmitting part 13b.

Further, the friction plates 12a are engaged with an engaging portion 213c made of ferrous metal at the inner circumferential side of a spline part 213a of the drum member 213 of the first clutch 210.

Further, a pulse sensor Z for detecting a rotational speed of the drum member 213 is provided at a position on the outer side of the spline part 213a of the drum member 213 of the first clutch 210 in the radial directions and adjacent thereto.

Figure 12:
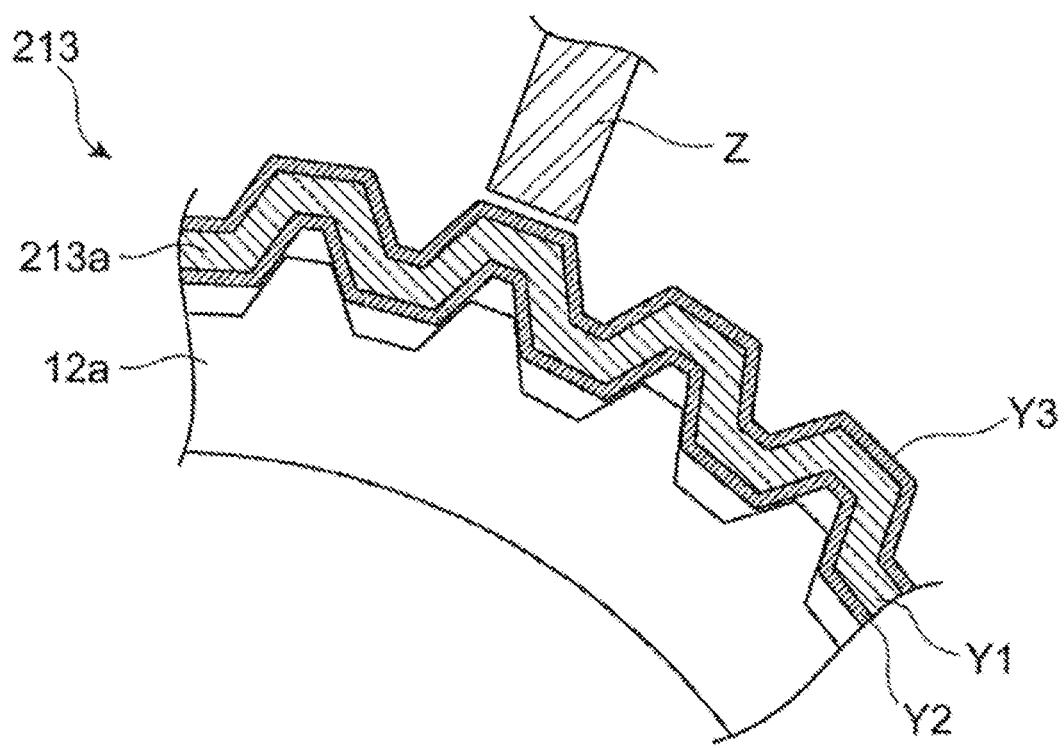
FIG. 12 is a B-B cross-sectional view of FIG. 11.

Normally, as illustrated in FIG. 12, the pulse sensor Z detects a distance between the drum member 213 and the pulse sensor Z, which changes due to unevenness of an outer circumferential portion of the spline part 213a of the drum member 213. For example, when the drum member 213 and the pulse sensor Z approach each other, a signal current flows through a coil of the pulse sensor Z, thus the rotational speed of the drum member 213 is detected.

Therefore, for example, when the parts of the drum member 213 of the first clutch 210 other than the drive force transmitting part 13b are made only of aluminum for weight reduction, it becomes difficult for the pulse sensor Z to detect the rotational speed. Whereas in this embodiment, the parts of the drum member 213 other than the drive force transmitting part 13b are made of the clad material Y and have the ferrous metal layers Y2 and Y3 at the inner circumferential side and the outer circumferential side thereof. Therefore, while reducing the weight by utilizing the aluminum layer Y1 as the intermediate layer, the strength of the engaging portion 213c of the spline part 213a is secured and, additionally, it is possible to use the conventional pulse sensor Z.

Next, clutches of a friction engagement device of an automatic transmission according to a third embodiment will be described with reference to FIG. 13. Note that the components similar to those in the first embodiment illustrated in FIGS. 3 and 8 are assigned with the same reference characters in FIG. 13, and description thereof is omitted.

In this embodiment, the structure of a hub member 311 of a first clutch 310 and the structure of a clutch member 323 of a second clutch 320 are different from those of the first embodiment except for the drive force transmitting part 11b and the drive force transmitting part 23b. Note that other parts have similar structures to those in the above embodiment, and similar effects to those in the first embodiment are obtained.

Figure 13:
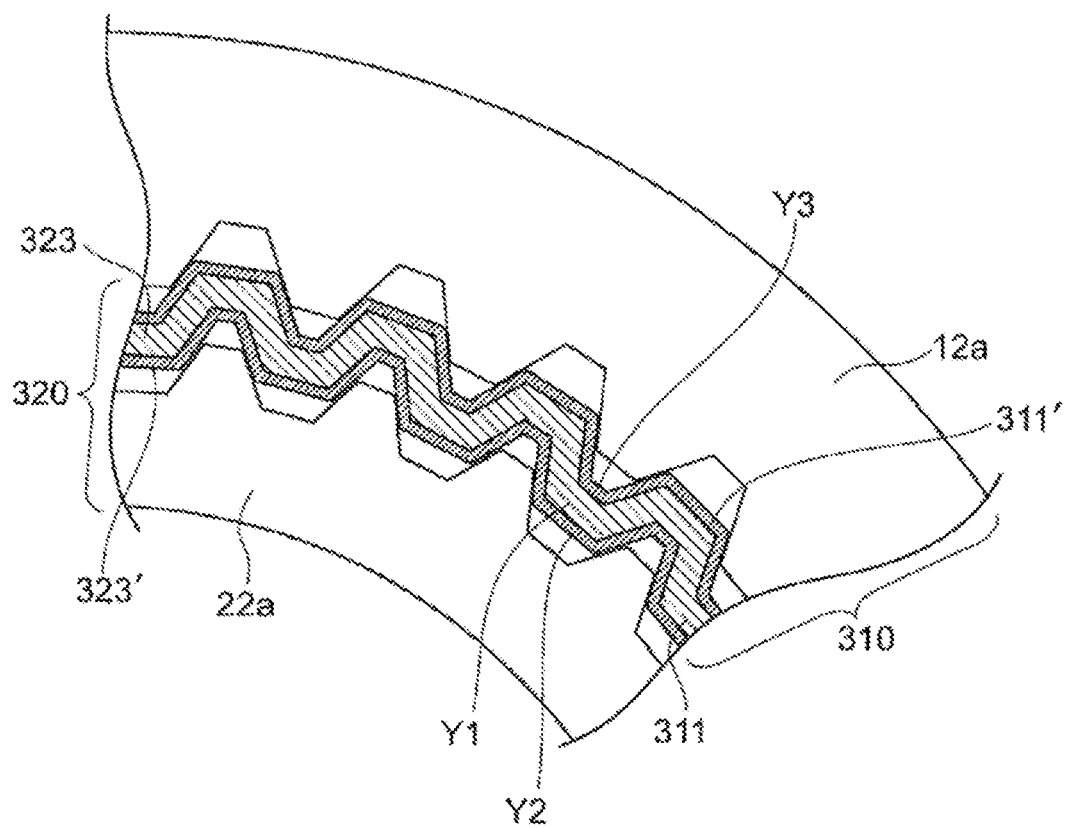
FIG. 13 is a cross-sectional view equivalent to FIG. 8 according to a third embodiment of the present disclosure.

As illustrated in FIG. 13, the first clutch 310 and the second clutch 320 are constructed into a dual clutch structure in which they are coaxially disposed to overlap radially, the hub member 311 as a rotational member of the first clutch 310 disposed on the outer circumferential side, and the drum member 323 as a rotational member of the second clutch 320 disposed on the inner circumferential side are mutually used by the clutches.

Further, the hub member 311 of the first clutch 310 and the drum member 323 (hereinafter referred to as "the rotational member 311 (323)") of the second clutch 320, which are the common members, are spline-engaged with the friction plates 12a of the first clutch 310 at the outer circumferential side and spline-engaged with the friction plates 22a of the second clutch 320 at the inner circumference side.

When the clad material Y having the three-layer structure is applied to the rotational member 311 (323), an engaging portion 311' with which the friction plates 12a are engaged and an engaging portion 323' with which the friction plates 22a are engaged in the rotational member 311 (323) are formed by the ferrous metal layers Y2 and Y3. Note that the aluminum layer Y1 as an intermediate layer is provided between the engaging portions 311' and 323'.

Such structure secures the strength of the engaging portion 311' and 323' with the friction plates 12a and 22a of the rotational member 311 (323). Further, the weight reduction is achieved by interposing the aluminum layer Y1 as the intermediate layer of the rotational member 311 (323).

A friction engagement device of an automatic transmission according to a fourth embodiment is described with reference to FIG. 14. Note that the components similar to those in the above embodiment illustrated in FIG. 6 are assigned with the same reference characters in FIG. 14, and description thereof is omitted.

In this embodiment, the structure of a drum member 413 of a first clutch 410 is different from those of the above embodiment except for the drive force transmitting part 13b. Note that other parts have similar structures to those in the above embodiment, and similar effects to those in the first embodiment are obtained.

Figure 14:
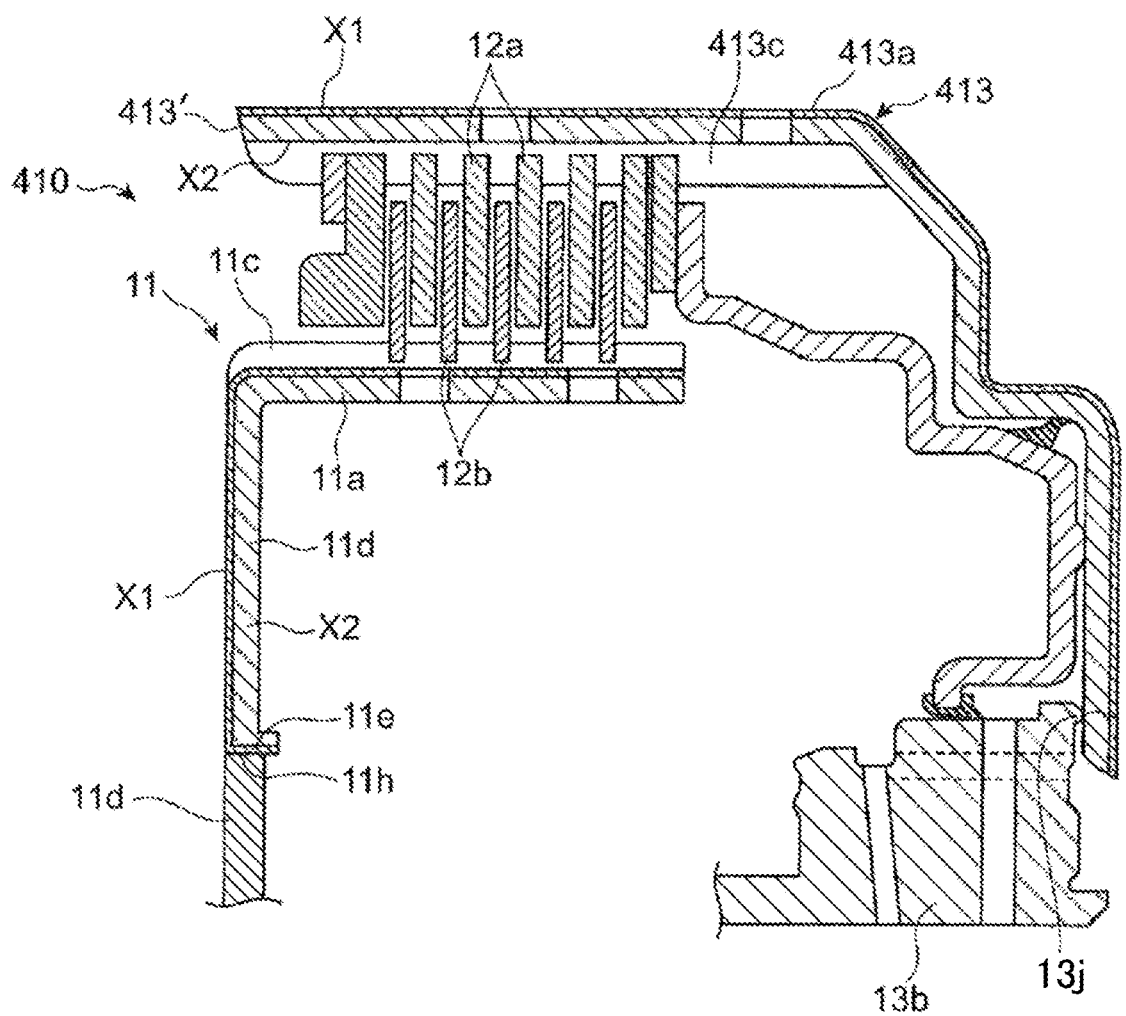
FIG. 14 is a cross-sectional view equivalent to FIG. 6 according to a fourth embodiment of the present disclosure.

As illustrated in FIG. 14, when the clad material X is applied to the drum member 413 of the first clutch 410, the clad material X is formed into a cylindrical shape by a deep drawing press work such that the ferrous metal layer X1 of the clad material X comes on the outer circumferential side and the aluminum layer X2 comes on the inner circumferential side. Then, a spline is formed in an inner circumferential surface of the aluminum layer X2.

Thus, the parts of the drum member 413 other than the drive force transmitting part 13b are made of the clad material X having the two-layer structure of the ferrous metal layer X1 on the outer circumferential portion side and the aluminum layer X2 on the inner circumferential portion side. The friction plates 12a are engaged with engaging portions 413c at the inner circumferential side of a spline part 413a of the drum member 413 of the first clutch 410.

Normally, there may be a case where an open-end portion 413' of the drum member 413 that is not joined to the drive force transmitting part 13b deforms to open wider due to centrifugal force caused by the rotation of the drum member 413 of the first clutch 410. However, since the portion of the spline part 413a of the drum member 413 on the side opposite from the engaging portion with the friction plates 12a is formed by the ferrous metal layer X1, rigidity of the drum member 413 of the clutch 410 itself is increased and the deformation of the drum member 413 is reduced compared to the case where the drum member 413 of the clutch 410 is made of aluminum.

Note that when the joining strength requirements are satisfied, the joining of the drive force transmitting part 13b with the parts other than the drive force transmitting part 13b may be performed by welding similarly to the first embodiment, while when the joining strength requirements are high, it may be performed by spline fitting, for example.

Although in the above embodiment, the clad material uses the ferrous metal as the first material and aluminum as the second material, the first material may be a material which is easily joined to the ferrous metal and the second material may be, for example, a material which is less easily joined to the ferrous metal compared to the first material and weighs less than the ferrous metal, e.g., magnesium.

As described above, it is possible that the present disclosure is suitably applied in the manufacturing industrial field of friction engagement devices of automatic transmissions that are mounted on vehicles.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Automatic Transmission
10 First Clutch (Friction Engagement Device)
11, 21, 92 Hub Member (Rotational Member)
11a, 13a Spline Part of Drum and Hub Members of First Clutch
11b, 21b Drive Force Transmitting Part of Drum and Hub Members of First Clutch
11c, 13c Engaging Portion of Drum and Hub Members of First Clutch
11e, 13e Joint Portion of Drum and Hub Members of First Clutch
11h, 21h Circumferential Surface Portion
12a, 12b Friction Plate of First Clutch
13, 23 Drum Member (Rotational Member)
13b, 23b Drive Force Transmitting Part of Drum and Hub Members of Second Clutch
13j, 23f Vertical Wall Portion
20 Second Clutch (Friction Engagement Device)
21a, 23a Spline Part of Drum and Hub Members of Second Clutch
21c, 23c Engaging Portion of Drum and Hub Members of Second Clutch
21e, 23e Joint Portion of Drum and Hub Members of Second Clutch
22a, 22b Friction Plate of Second Clutch
90 Third Brake (Friction Engagement Device)
91a, 91b Friction Plate of Third Brake
92b (64) Drive Force Transmitting Part of Hub Member of Third Brake
92c Engaging Portion of Drum and Hub Members of Third Brake
92f Joint Portion of Hub Member of Third Brake
X1, Y2, Y3 Ferrous Metal Layer (First Material)
X2, Y1 Aluminum Layer (Second Material)

What is claimed is:

1. A friction engagement device of an automatic transmission, comprising a rotational member comprised of at least one of a drum member and a hub member including:
a spline part engaged with a friction plate to be movable in axial directions of the automatic transmission; and
a drive force transmitting part for exchanging a drive force with another rotational element,
wherein the drive force transmitting part of the rotational member is made of a ferrous metal,
wherein a part of the rotational member other than the drive force transmitting part is made of a clad material containing a first material that is joined to the ferrous metal, and a second material that is joined to the ferrous metal with less joint strength compared to the first material and weighs less than the ferrous metal,
wherein the part of the rotational member other than the drive force transmitting part is formed separately from the drive force transmitting part, and wherein the clad material has a first material side containing the first material and comprising the part of the rotational member other than the drive force transmitting part, the first material side engaging with the drive force transmitting part.

2. The friction engagement device of claim 1, wherein the first material of the clad material is the ferrous metal, the second material is aluminum, and the clad material has a two-layer structure of the first and second materials.

3. The friction engagement device of claim 2, wherein the part of the rotational member other than the drive force transmitting part has a joint portion with the drive force transmitting part, the spline part of the rotational member has an engaging portion with the friction plate, and the joint portion and the engaging portion are made of the first material of the clad material.

4. The friction engagement device of claim 2, wherein a portion of the spline part of the rotational member on an opposite side from an engaging portion with the friction plate is made of the first material of the clad material.

5. The friction engagement device of claim 1, wherein the clad material has a three-layer structure in which an intermediate layer is made of the second material and layers on both sides of the intermediate layer are made of the first material.

6. The friction engagement device of claim 1, wherein the drive force transmitting part of the rotational member has a vertical wall portion extending orthogonal to an axis of the rotational member, and wherein the clad material is joined to the vertical wall portion.

7. The friction engagement device of claim 1, wherein the drive force transmitting part of the rotational member has a circumferential surface portion having a center line parallel to an axis of the rotational member, and wherein the clad material is joined to the circumferential surface portion.

* * * * *